(12) United States Patent
Gupta et al.

(10) Patent No.: US 9,959,315 B1
(45) Date of Patent: May 1, 2018

(54) CONTEXT SCORING ADJUSTMENTS FOR ANSWER PASSAGES

(71) Applicant: Google LLC, Mountain View, CA (US)

(72) Inventors: Nitin Gupta, Santa Clara, CA (US); Srinivasan Venkatachary, Sunnyvale, CA (US); Lingkun Chu, Fremont, CA (US); Steven D. Baker, Palo Alto, CA (US)

(73) Assignee: Google LLC ( * ) Notice: Subject to any disclaimer, the term of this patent is extended or adjusted under 35 U.S.C. 154(b) by 642 days.

(21) Appl. No.: 14/169,960

(22) Filed: Jan. 31, 2014

(51) Int. Cl.
*G06F 17/30* (2006.01)

(52) U.S. Cl.
CPC .............. *G06F 17/30528* (2013.01)

(58) Field of Classification Search
CPC ................................. G06F 17/30528
See application file for complete search history.

(56) References Cited

U.S. PATENT DOCUMENTS

| | | | | |
|---|---|---|---|---|
| 5,724,571 A * | 3/1998 | Woods | ............ | G06F 17/30011 |
| 5,943,669 A * | 8/1999 | Numata | ............ | G06F 17/30707 |
| 7,181,447 B2 | 2/2007 | Curtis | | |
| 8,122,042 B2 | 2/2012 | Pan | | |
| 8,380,713 B2 | 2/2013 | Oh | | |
| 2012/0301864 A1* | 11/2012 | Bagchi | ............ | G09B 7/02 434/362 |
| 2014/0297571 A1* | 10/2014 | Beamon | ............ | G06N 99/005 706/12 |
| 2014/0298199 A1* | 10/2014 | Johnson, Jr. | ............ | H04L 65/403 715/753 |

OTHER PUBLICATIONS

Su et al., "Indexing Relational Database Content Offline for Efficient Keyword-Based Search," [online] [Retrieved on Jan. 31, 2014]; Retrieved from the Internet URL: http://ilpubs.stanford.edu:8090/57711/2003-13.pdf; 13 pages.

* cited by examiner

*Primary Examiner* — Rehana Perveen
*Assistant Examiner* — Huen Wong
(74) *Attorney, Agent, or Firm* — Fish & Richardson P.C.

(57) ABSTRACT

Methods, systems, and apparatus, including computer programs encoded on a computer storage medium, for context scoring adjustments for candidate answer passages. In one aspect, a method includes scoring candidate answer passages. For each candidate answer passage, the system determines a heading vector that describes a path in the heading hierarchy from the root heading to the respective heading to which the candidate answer passage is subordinate; determines a context score based, at least in part, on the heading vector; and adjusts answer score of the candidate answer passage at least in part by the context score to form an adjusted answer score. The system then selects an answer passage from the candidate answer passages based on the adjusted answer scores.

20 Claims, 7 Drawing Sheets

CONTEXT SCORING ADJUSTMENTS FOR ANSWER PASSAGES

BACKGROUND

This specification relates to search engine query processing.

The Internet provides access to a wide variety of resources, such as image files, audio files, video files, and web pages. A search system can identify resources in response to queries submitted by users and provide information about the resources in a manner that is useful to the users.

SUMMARY

Users of search systems are often searching for an answer to a specific question, rather than a listing of resources. For example, users may want to know what the weather is in a particular location, a current quote for a stock, the capital of a state, etc. When queries that are in the form of a question are received, some search engines may perform specialized search operations in response to the question format of the query. For example, some search engines may provide information responsive to such queries in the form of an "answer," such as information provided in the form of a "one box" to a question.

Some question queries are better served by explanatory answers, which are also referred to as "long answers" or "answer passages." For example, for the question query [why is the sky blue], an answer explaining Rayleigh scatter is helpful. Such answer passages can be selected from resources that include text, such as paragraphs, that are relevant to the question and the answer. Sections of the text are scored, and the section with the best score is selected as an answer.

In general, one innovative aspect of the subject matter described in this specification can be embodied in methods that include the actions of receiving a query determined to be a question query that seeks an answer response; for each resource of at least one or more resources: receive candidate answer passages, each candidate answer passage being text selected from a text section that is subordinate to a respective heading in the resource and having a corresponding answer score, and determining a heading hierarchy in the resource, the heading hierarchy having two or more heading levels hierarchically arranged in parent-child relationships, wherein each heading level has one or more headings, a subheading of a respective heading is a child heading in the parent-child relationship and the respective heading is a parent heading in the relationship, and the heading hierarchy includes a root level corresponding to a root heading; for each candidate answer passage: determining a heading vector that describes a path in the heading hierarchy from the root heading to the respective heading to which the candidate answer passage is subordinate, determining a context score based, at least in part, on the heading vector, adjusting the answer score of the candidate answer passage at least in part by the context score to form an adjusted answer score; and selecting an answer passage from the candidate answer passages based on the adjusted answer scores. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Long query answers are further selected, based in part on context signals that indicate that the answers are relevant to the question. The context signals may be, in part, query-independent, i.e., scored independently of their relatedness to terms of the query. This portion of the scoring process considers the context of the document ("resource") in which the answer text is located, and thus accounts for relevancy signals that may not otherwise be accounted for during query-dependent scoring. Accordingly, long answers that are more likely to satisfy the user's informational need are more likely to surface.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A context scoring process receives candidate answer passages and a score for each passage. The candidate answer passages and the respective scores are provided to a search system receiving a query that is determined to be a question. Each candidate answer passage is text selected from a text section that is subordinate to a respective heading in a respective resource and has a corresponding answer score.

For each resource from which a candidate answer passage has been selected, the context scoring process determines a heading hierarchy in the resource. A heading is text or other data that corresponds to a particular passage in the resource. For example, a heading may be text that summarizes a section of text that immediately follows the heading. The headings may be indicated, for example, by formatting data, such as heading tags. Alternatively, a heading may be anchor text for an internal resource link that links to an anchor and the corresponding section text at some other position within the resource.

The heading hierarchy has two or more heading levels hierarchically arranged in parent-child relationships. The first level is the root heading, which, for example, is the title of the resource. Each heading level may have one or more headings, and a subheading of a respective heading is a child heading and the respective heading is a parent heading in the parent-child relationship.

For each candidate passage, the context scoring process determines a context score based, at least in part, on the relationship between the root heading and the respective heading to which the candidate answer passage is subordinate. In some implementations, the context scoring process, to determine the context score, determines a heading vector that describes a path in the heading hierarchy from the root heading to the respective heading. The context score is based, at least in part, on the heading vector. The context scoring process then adjusts the answer score of the candidate answer passage at least in part by the context score to form an adjusted answer score. The context scoring process then selects an answer passage from the candidate answer passages based on the adjusted answer scores.

These features and addition features are described in more detail in the sections that follow.

Example Operating Environment

Figure 1:
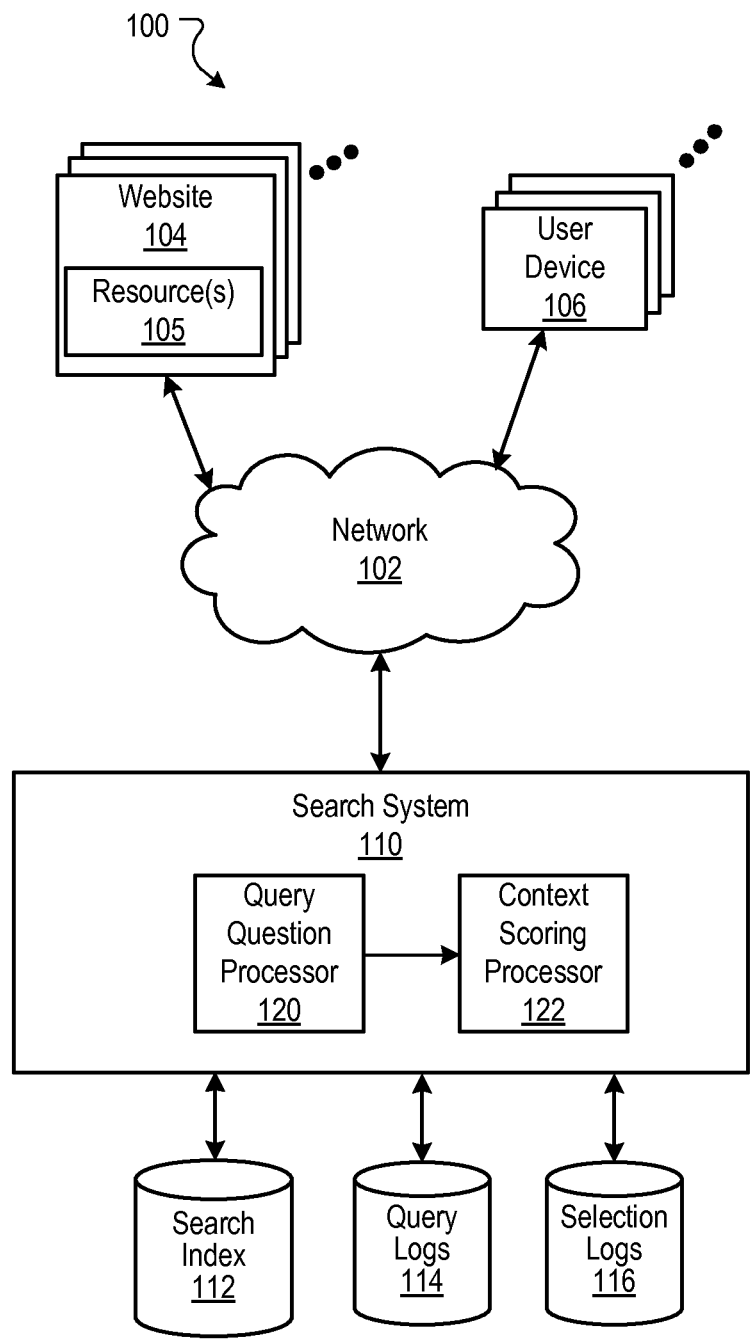
FIG. 1 is an illustration of an environment in which the context of an answer in a resource is used, in part, to score the answer.

FIG. 1 is an illustration of an environment 100 in which rich content is provided with an answer to a question query. A computer network 102, such as the Internet, connects publisher websites 104, user devices 106, and a search system 110. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search system 110 crawls the publisher websites 104 and indexes the resources provided by the publisher websites 104. The index data are stored in a resource index 112.

The user devices 106 submit search queries to the search system 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search system 110, or some other identifier that identifies the user device 106 or the user using the user device.

In response to the search request, the search system 110 uses the index 112 to identify resources that are relevant to the queries. The search system 110 identifies the resources in the form of search results and returns the search results to the user devices 106 in search results page resource. A search result is data generated by the search system 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

In some implementations, the queries submitted from user devices 106 are stored in query logs 114. Selection data for the queries and the web pages referenced by the search results and selected by users are stored in selection logs 116. The query logs 114 and the selection logs 116 include data from and related to previous search requests associated with unique identifiers. The selection logs represent actions taken in response to search results provided by the search system 110. Examples of such actions include clicks on the search results. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices, the actions taken in response to the queries, and how often the queries have been submitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Question Queries And Answer Passages

As described above, some queries are in the form of a question, or in the form of an implicit question. For example, the query [distance of the earth from the moon] is in the form of an implicit question "What is the distance of the earth from the moon?" Likewise, a question may be specific, as in the query [How far away is the moon]. The search system 110 includes a query question processor 120 that utilizes processes to determine if a query is a query question, and, if so, whether there are answers that are responsive to the question. The query question processor 120 can use a variety of different algorithms to determine whether a query is a question and whether there are particular answers responsive to the question. For example, the query question processor 120 may utilize language models, machine learned processes, knowledge graphs, grammars, or combinations thereof, to determine question queries and answers.

In some implementations, the query question processor 120 may select candidate answer passages in addition to or instead of an answer fact. For example, for the query [how far away is the moon], an answer fact is 238,900 miles. This is the average distance of the Earth from the moon. However, the query question processor 120 may also identify passages that are determined to be very relevant to the question query. These passages, when initially selected, are candidate answer passages. These passages are scored, and one passage is selected based on these scores and provided in response to the query.

Figure 2:
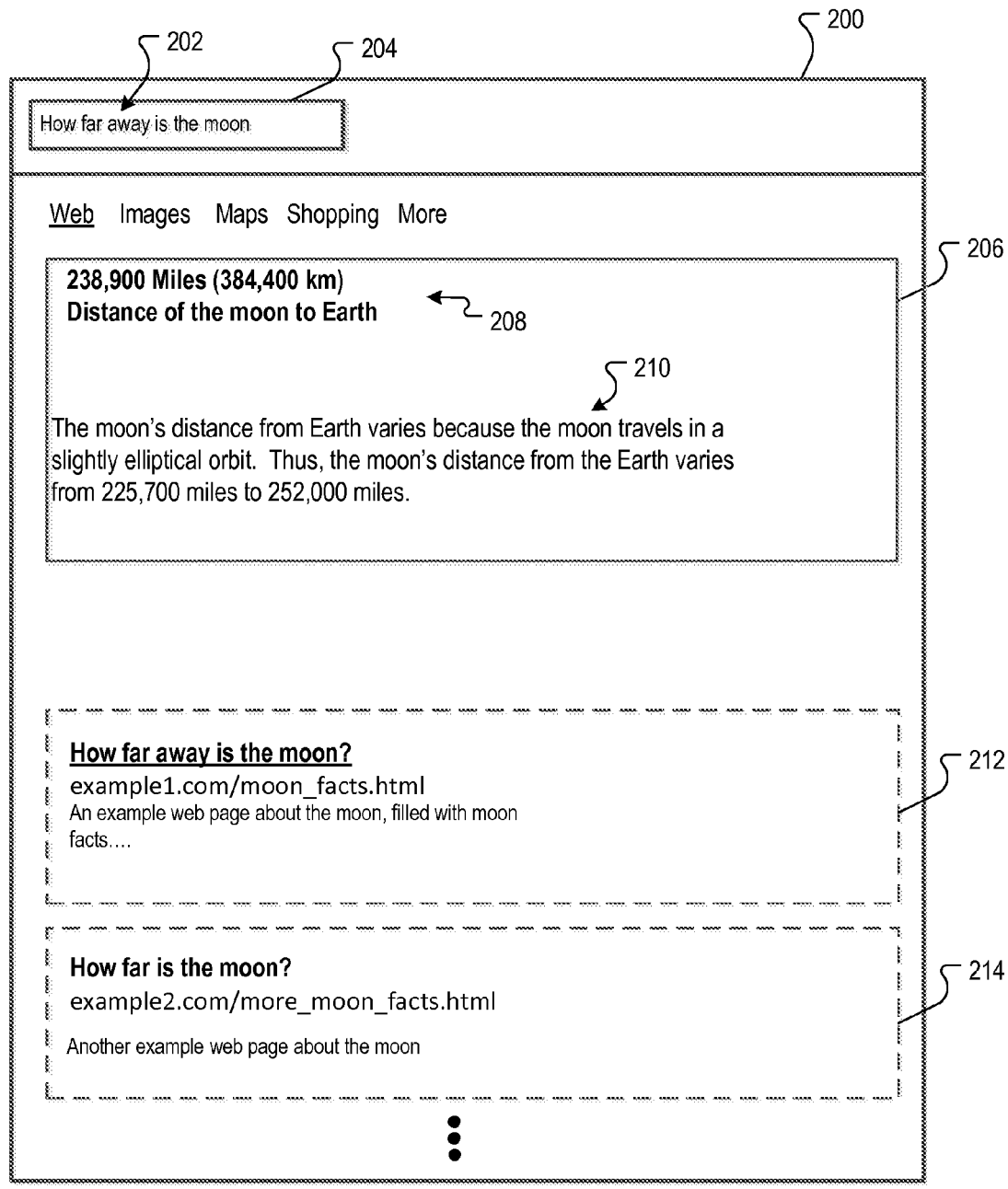
FIG. 2 is an illustration of a search results resource in which an answer passage is provided with an answer to a question query.

FIG. 2 is an illustration of a search results resource 200 in which an answer passage is provided with an answer to a question query. The query 202 [How far away is the moon] has been input in the input field 204. The query question processor 120 identifies the query as a question query, and also identifies the answer 208 "289,900 Miles (364,400 km)." The search system 110, in connection with the query question processor 120, provides an answer box 206 in response to the determination that the query is a question query and that an answer is identified. The answer box 206 includes the answer 208.

Additionally, the answer box 206 includes an answer passage 210. The answer passage 210 is one of multiple answer passages that were processed by the query question processor 120 and the context scoring processor 122. Additional information, such as search results 212 and 214, can also be provided on the search results page.

Figure 3:
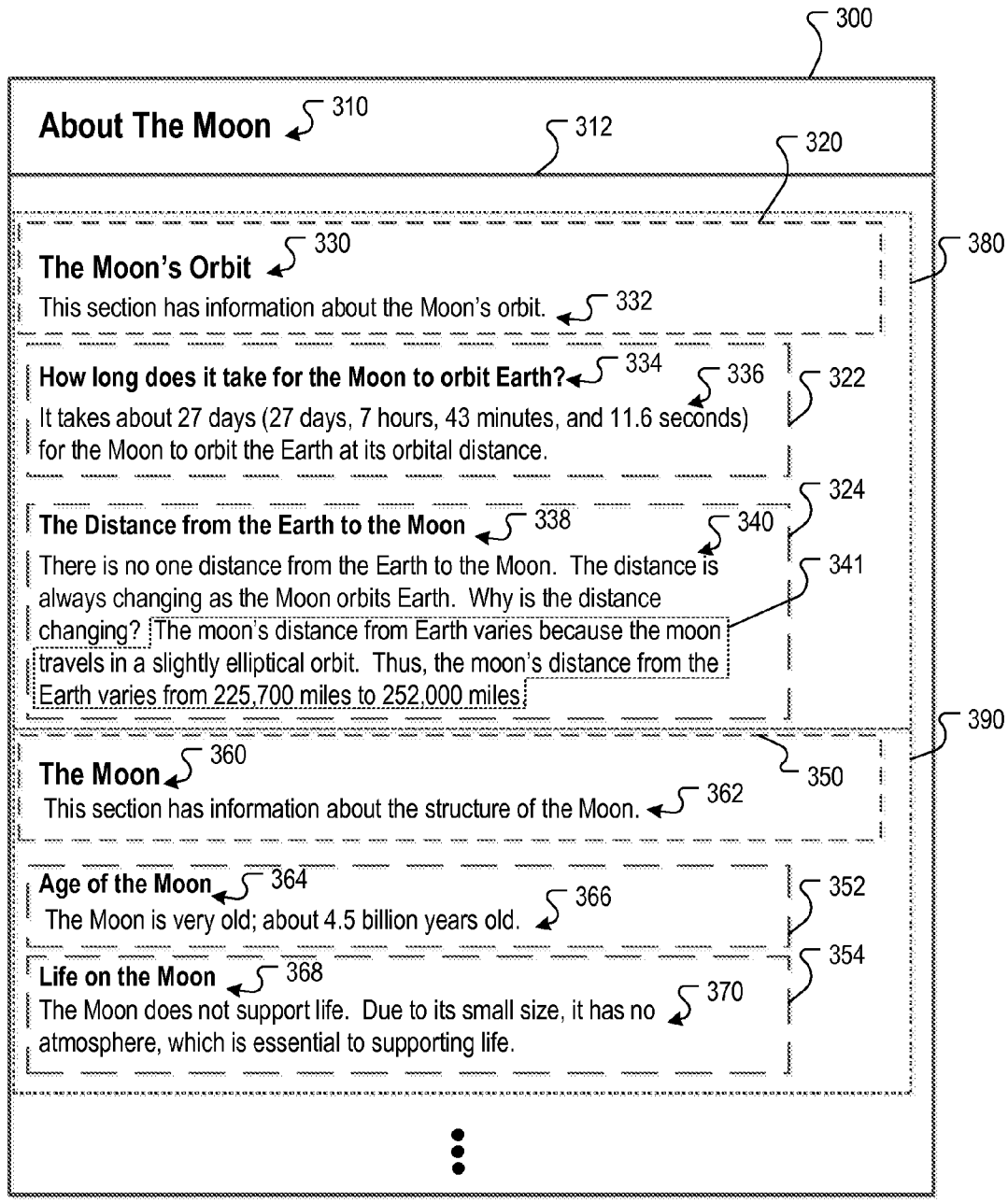
FIG. 3 is an illustration of a web page resource from which the answer passage of FIG. 2 was selected.

FIG. 3 is an illustration of a web page resource 300 from which the answer passage 210 of FIG. 2 was selected. The web page resource 300 is, for example, rendered by a browser application that interprets a mark-up language document. The resource 300 includes multiple heading 310, 330, 334, 338, 360, 364, and 368. Each heading 310, 330, 334, 338, 360, 364, and 368 has a respective corresponding text section 312, 320, 322, 324, 350, 352 and 354 that is subordinate to its respective heading. As used herein, a section is subordinate to a heading when the structure is such that the section directly "descends" from the heading. A text section need not be adjacent to the heading to which it is subordinate; for example, a heading may be linked in a resource that causes the browser to scroll to another portion of the resource so that the viewport is focused on the text section. In the context of a document object model, a text section is subordinate to a heading when it is subordinate body text to the heading. For example, in FIG. 3, the text 340 is subordinate to the heading 338; but it is not subordinate to the heading 334, 330, or 310.

As will be described in more detail below, multiple different candidate answer passages are generated from the resource 300 and scored. Pursuant to the processes described below, the candidate answer passage 341 of the text 340 is selected for the answer passage 210 in FIG. 2.

Contextual Scoring Adjustments for Answer Passages

In operation, the query question processor 120 provides to the context scoring processor 122 a set of candidate answer passages, data describing the resources from which each candidate answer passage was selected, and a score for each candidate answer passage. The score or each candidate answer passage may be based on one or more of the following considerations: matching a query term to the text of the candidate answer passage; matching of answer terms to the text of the candidate answer passages; and the quality of the underlying resource from which the candidate answer passage was selected. The query question processor 120 can also take into account other factors when scoring candidate answer passages.

Each candidate answer passage can be selected from text of a particular section of the resource. Furthermore, the query question processor 120 may select more than one candidate answer passage from a text section. For example, with respect to FIG. 3, the following candidate answer passages may be provided from the query question processor 120:

(1) It takes about 27 days (27 days, 7 hours, 43 minutes, and 11.6 seconds) for the Moon to orbit the Earth at its orbital distance.

(2) Why is the distance changing? The moon's distance from Earth varies because the moon travels in a slightly elliptical orbit. Thus, the moon's distance from the Earth varies from 225,700 miles to 252,000 miles.

(3) The moon's distance from Earth varies because the moon travels in a slightly elliptical orbit. Thus, the moon's distance from the Earth varies from 225,700 miles to 252,000 miles.

More than three candidate answers can be selected from the resource 300, and more than one resource can be processed for candidate answers. However, for simplicity in the example, only three candidate answers from one resource are considered.

Candidate answer (3) is similar to candidate answer (2), except that it does not include the first sentence "Why is the distance changing?" A candidate answer can be selected in a variety of appropriate ways. Examples include selection of one or more sentences, and selection of up to a maximum number of characters.

Each candidate answer has a corresponding score. For this example, assume that candidate answer passage (2) has the highest score, followed by candidate answer passage (3), and then by candidate answer passage (1). Thus, without the context scoring processor 122, candidate answer passage (2) would have been provided in the answer box 206 of FIG. 2. However, the context scoring processor 122 takes into account the context of the answer passages, and adjusts the scores provided by the query question processor 122.

Figure 4:
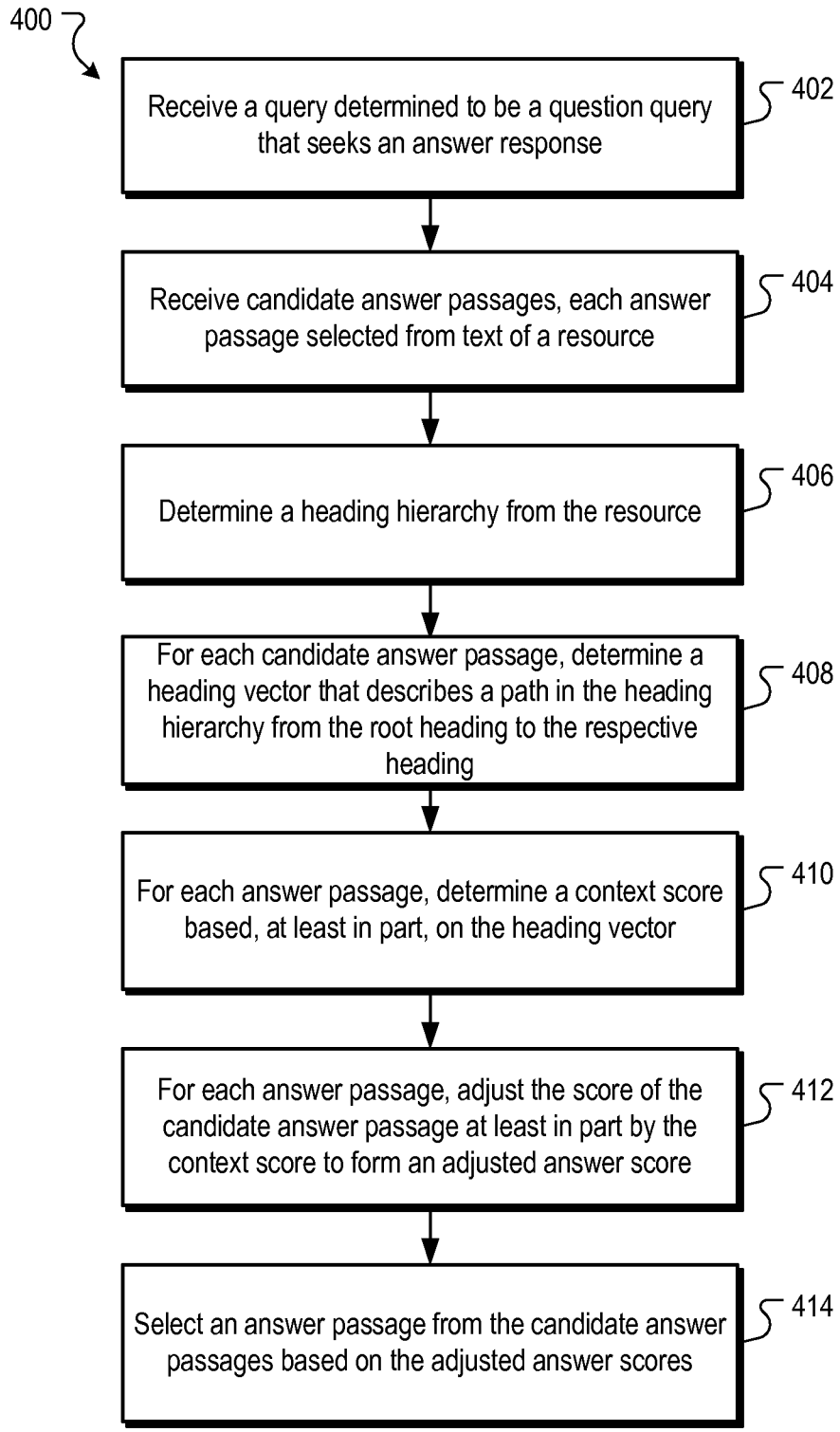
FIG. 4 is a flow diagram of an example process for contextually scoring an answer passage.

FIG. 4 is a flow diagram of an example process 400 for contextually scoring an answer passage. The process 400 is implemented in a data processing apparatus, such as one or more computers in a search system 110. The process 400 is described with reference to a single resource, but the process 400, in practice, may evaluate candidate answer passages from many resources. Thus, steps (404)-(412) below can be done for multiple resources in response to a question query.

The process 400 receives a query determined to be a question query that seeks an answer response (402). For example, the query question processor 120 provides a query determined to be a question query to the context scoring processor 122.

The process 400 receives candidate answer passages, each candidate answer passage selected from text of a resource (404). Each candidate answer passage is text selected from a text section that is subordinate to a respective heading in the resource and has a corresponding answer score. For example, the query question processor 120 provides the candidate answer passages (1)-(3), and their corresponding scores, to the context scoring processor 122.

The process 400 determines a heading hierarchy from the resource (406). The heading hierarchy has two or more heading levels hierarchically arranged in parent-child relationships. Each heading level has one or more headings. A subheading of a respective heading is a child heading in the parent-child relationship and the respective heading is a parent heading in the relationship. The heading hierarchy includes a root level corresponding to a root heading. In some implementations, the context scoring processor 122 processes heading tags in a DOM tree to determine a heading hierarchy. For example, with respect to FIG. 3, the heading hierarchy for the resource 300 may be:

ROOT: About The Moon (310)
  H1: The Moon's Orbit (330)
    H2: How long does it take for the Moon to orbit Earth? (334)
    H2: The distance from the Earth to the Moon (338)
  H1: The Moon (360)
    H2: Age of the Moon (364)
    H2: Life on the Moon (368)

In this heading hierarchy, heading 310 is the root heading at the root level; headings 330 and 360 are child headings of the heading 310, and are at a first level below the root level; headings 334 and 338 are child headings of the heading 330, and are at a second level that is one level below the first level, and two levels below the root level; and headings 364 and 368 are child headings of the heading 360, and are at a second level that is one level below the first level, and two levels below the root level.

The process determines a context score based, at least in part, on the relationship between the root heading and the respective heading to which the candidate answer passage is subordinate. In some implementations, this score is based on a heading vector. For example, the process 400, for each candidate answer passage, determines a heading vector that describes a path in the heading hierarchy from the root heading to the respective heading (408). In some implementations, the heading vector includes the text of the headings for the candidate answer passage. For example, for the candidate answer passages (1)-(3) above, the respectively corresponding heading vectors V1, V2 and V3 are:

V1=<[Root: About The Moon],
  [H1: The Moon's Orbit],
  [H2: How long does it take for the Moon to orbit the Earth?]>
V2=<[Root: About The Moon],
  [H1: The Moon's Orbit],
  [H2: The distance from the Earth to the Moon]>
V3=<[Root: About The Moon],
  [H1: The Moon's Orbit],
  [H2: The distance from the Earth to the Moon]>

Because candidate answer passages (2) and (3) are selected from the same text section 340, their respective heading vectors V2 and V3 are the same.

The process 400, for each answer passage, determines a context score based, at least in part, on the heading vector (410). The context score can be a single score that is used to scale the score of the candidate answer passage, or can be a series of discrete scores/boosts that can be used to adjust the score of the candidate answer passage. Examples of various context scoring schemes are described with reference to FIGS. 5-7. Additionally, other features can be considered for scoring adjustments, as described with reference to FIGS. 8 and 9 below.

The process 400, for each answer passage, adjusts the score of the candidate answer passage at least in part by the context score to form an adjusted answer score (412). A variety of appropriate scoring adjustment schemes can be used. The adjustment may involve one or more of an additive process, a multiplicative process, etc.

The process 400 selects an answer passage from the candidate answer passages based on the adjusted answer scores (412). In some implementations, the candidate answer score with the highest adjusted answer score is selected, and the answer passage. Recall that in the example above, the candidate answer passage (2) had the highest score, followed by candidate answer passage (3), and then by candidate answer passage (1). However, after adjustments, candidate answer passage (3) has the highest score, followed by candidate answer passage (2), and then candidate answer passage (1). Accordingly, candidate answer passage (3) is selected and provided as the answer passage 210 of FIG. 2.

Other ways of determining a context score based on the relationship between the root heading and the respective heading to which the candidate answer passage is subordinate can also be used. Such other ways are described below, and can be used instead of, or in addition to and in conjunction with, the process described above.

Scoring Based on Heading Vector

The heading vector can be used in multiple different ways to adjust the score of a candidate answer passage. Example implementations include scoring based on the heading vector depth, scoring based on the similarity of the query and text from the headings in the heading vector, and scoring based on best matches of heading sets from the heading vector. Each example implementation is respectively described with reference to FIGS. 5-7 below. The context scoring processor 122 can implement any of these processes either alone or in combination.

Figure 5:
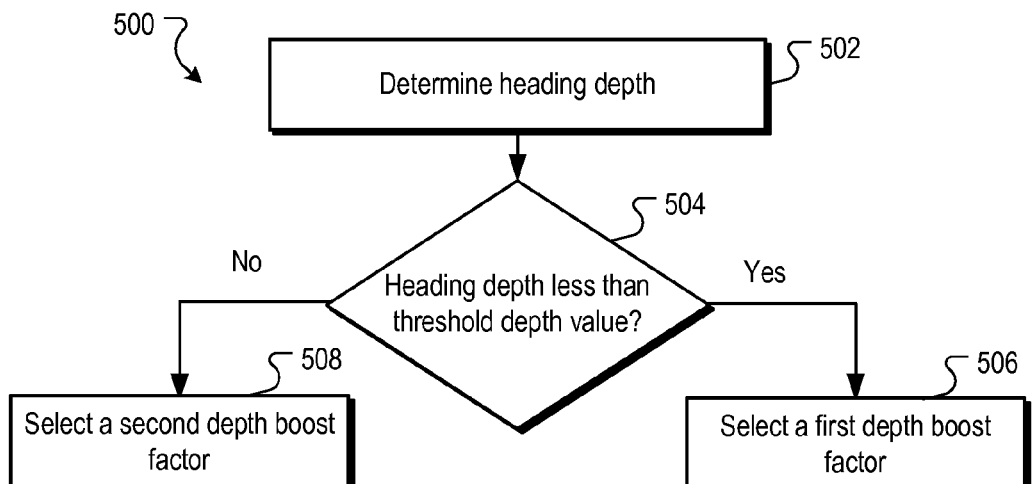
FIG. 5 is a flow diagram of an example process for contextually scoring an answer passage based on a heading vector depth.

FIG. 5 is a flow diagram of an example process 500 for contextually scoring an answer passage based on a heading vector depth. The process 500 is implemented in a data processing apparatus, such as one or more computers in a search system 110.

The process 500 determines a heading depth (502). The heading depth is proportional to a number of parent headings from which the respective heading descends from the root node. For example, for the number for each of V1, V2 and V3 above is 2, as each respective heading at level H2 has a parent heading at level H1, and each respective heading at level H1, in turn, has a parent heading at level ROOT. Alternatively, the heading at level H2 can also be counted, in which case the number is 3.

The process 500 determines whether the heading depth is less than a threshold value (504). A candidate answer passage that is subordinate to a heading at the threshold value or deeper is considered to be a "deep" passage; otherwise, it is considered to be a shallow passage. For example, assume the threshold value is 2. A passage "This section has information about the Moon's orbit" would have a depth of 1, and thus would be a shallow passage. Conversely, the candidate answer passages (1)-(3) above are determined to be deep passages. Deep passage scores are increased relative to shallow passage scores.

If the process 500 determines the heading depth is less than a threshold value, then the process 500 selects a first depth boost factor (506); conversely, if the process 500 determines the heading depth is not less than a threshold value, then the process 500 selects a second depth boost factor (508). The second boost factor is greater than the first boost factor. For example, the first boost factor may be 1.0, or even a value less than 1.0; the second boost factor may be, for example, a value larger than 1.0.

In other implementations, an answer score can be adjusted based on the depth of the heading vector. For example, a first adjustment occurs for a depth of 1; a second adjustment for the depth of 2; a third adjustment for the depth of 3; and so on. The deeper the depth, the greater the increase in the answer score.

Figure 6:
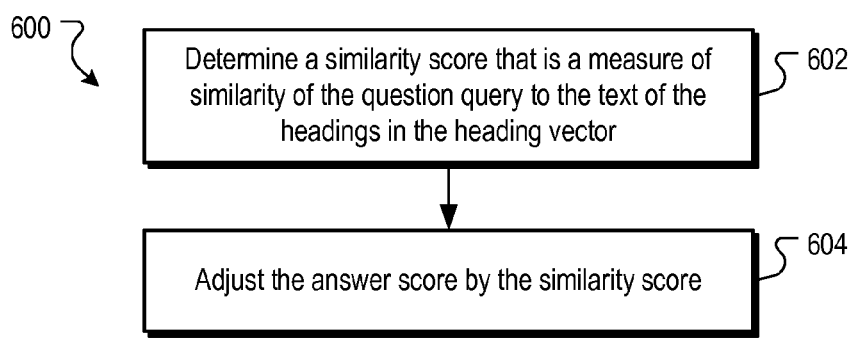
FIG. 6 is a flow diagram of an example process for contextually scoring an answer passage based heading text in a heading vector.

FIG. 6 is a flow diagram of an example process 600 for contextually scoring an answer passage based heading text in a heading vector. The process 600 is implemented in a data processing apparatus, such as one or more computers in a search system 110.

The process 600 determines a similarity score that is a measure of similarity of the question query to the text of the headings in the heading vector (602). The similarity is, in some implementations, between the question query and text in the heading vector. A closest heading can be selected for comparison, or the text from multiple headings can be concatenated for the comparison. A variety of similarity measurement processes can be used, such as term matching, synonym matching, etc.

For example, with respect to FIG. 3, heading vectors V2 and V3 would have a higher similarity score for the query "How far away is the moon" than for the vector V1. This is because the vector V1 does not include a term related to distance, while vectors V2 and V3 do include a distance related term, which results in those vectors being determined to be more similar to the query, based on the term "far."

The process 600 adjusts the answer score by the similarity score (604). In some implementations, the score can be adjusted if the similarity score exceeds a threshold similarity. Other adjustment techniques can also be used.

In variations of this implementation, the text of the candidate answer passage can also be compared to the text of the heading vectors, and the similarity between the two can be accounted for in the similarity measure.

Figure 7:
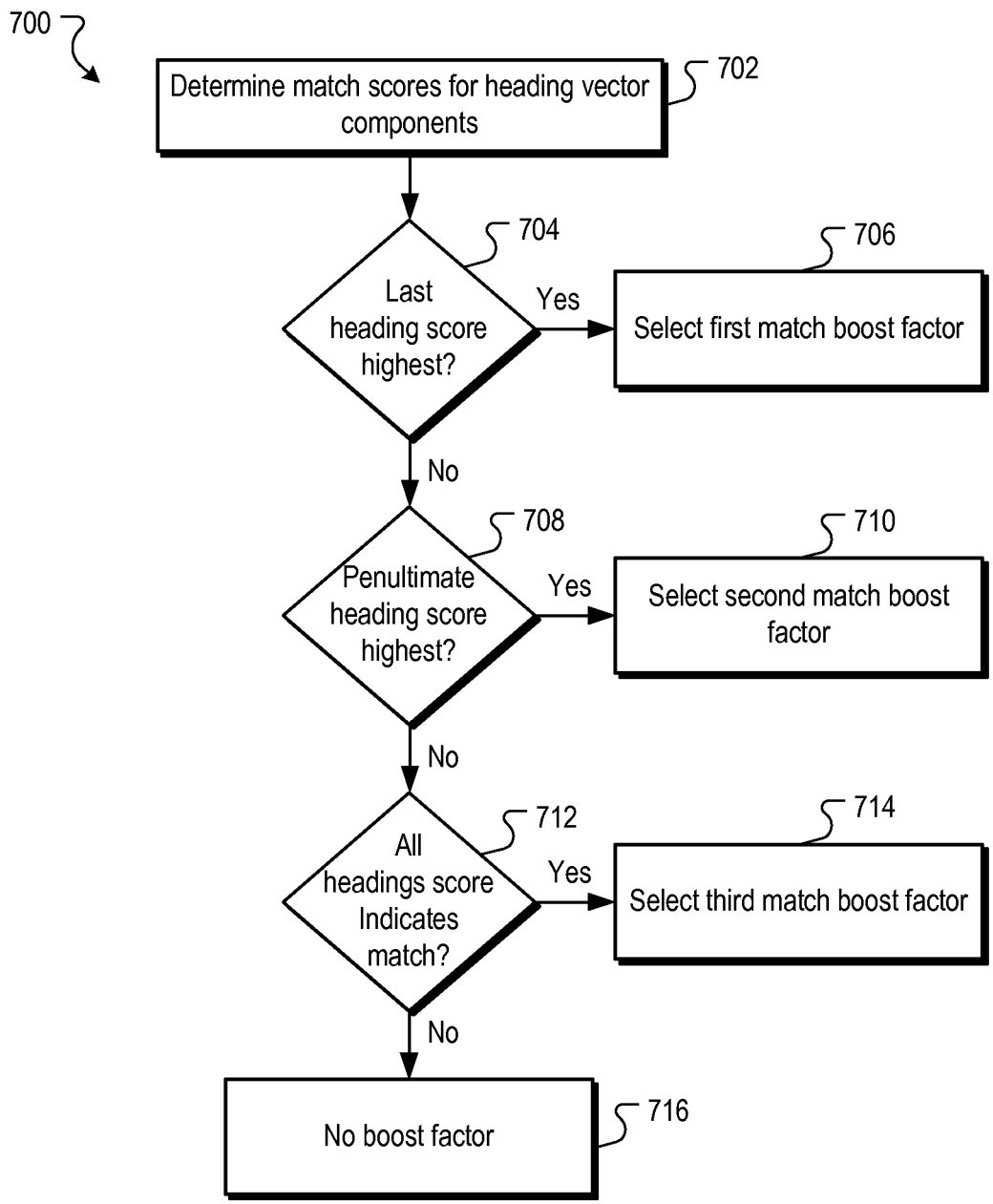
FIG. 7 is a flow diagram of an example process for contextually scoring an answer passage based on heading matches.

FIG. 7 is a flow diagram of an example process 700 for contextually scoring an answer passage based on heading matches. The process 700 is implemented in a data processing apparatus, such as one or more computers in a search system 110. Unlike the process 600 of FIG. 6, the process 700 generates multiple heading scores.

The process 700 determines match scores for heading vector components (702). A first score is the score that measures the similarity of the heading to which the candidate answer passage is subordinate. For example, the first score for vector V1 is based on the similarity of the query [How far away is the moon] to the heading text "How long does it take the moon to orbit the Earth?" Likewise, the first scores for vector V2 are based on the similarity of the query [How far away is the moon] to the heading text "The Distance from the Earth to the Moon."

A second score is a penultimate score that is a measure of similarity of the question to query to text of the respective heading to which the candidate answer passage is subordinate and the text of a parent heading of the respective heading. For example, the penultimate score for vector V1 is based on the similarity of the query [How far away is the moon] to the combined heading text "How long does it take the moon to orbit the Earth, The Moon's Orbit." Likewise, the penultimate scores for vector V2 are based on the similarity of the query [How far away is the moon] to the combined heading text "The Distance from the Earth to the Moon, The Moon's Orbit."

Multiple scores can be determined, one for each incremental heading back to the root heading. Alternatively, after the first two scores above are determined, a third score that takes into account all the headings in the path of the heading vector is determined. This score is referred to as the "all headings score." For example, the all headings score for vector V1 is based on the similarity of the query [How far away is the moon] to the combined heading text "How long does it take the moon to orbit the Earth, The Moon's Orbit, About The Moon." Likewise, the all headings scores for vector V2 are based on the similarity of the query [How far away is the moon] to the combined heading text "The Distance from the Earth to the Moon, The Moon's Orbit, About the Moon."

The process 700 determines if the last heading score is the highest score (704). This score being the highest indicates the heading if very relevant to the question. For example, for the question query [How far away is the moon], the heading text "The Distance from the Earth to the Moon" will have the highest similarity score. Thus, the process 700 selects a first match boost factor (706). This boost factor may be a fixed value, or may be proportional to the similarity score according to a first relation when the similarity score exceeds the threshold.

Conversely, if the last heading score is not the highest score, then the process 700 determines if the penultimate heading score is the highest score (708). If the penultimate heading score is the highest score, then the process 700 selects a second match boost factor (710). The second match boost factor can be selected in the same way the first match boost factor is selected, but the second match boost factor is smaller than the first match boost factor. This condition occurs when the first heading is not highly similar or a good "match" to the input question, but the first heading and its parent, when combined, form a good match.

For example, assume a question query is [How to get speeding ticket dismissed in South Carolina]. Assume there are two headings in a heading vector for a candidate answer passage, and the two headings are "Traffic Ticket FAQ in South Carolina" and a child heading "How can I get my traffic ticket dismissed?" The match to the two headings is a signal that within the scope of these two headings is a useful passage.

Finally, if the penultimate head score is not the highest score, then the process 700 determines if all headings score indicates a match (712). If there is a threshold match, e.g., the similarity measure of the question query to the text of all the headings of the resource meets a minimum threshold, then the process 700 selects a third match boost factor (714). The third boost factor is less than the second boost factor. This indicates the page as a whole may be directed to an answer for the question query. Conversely, if the all headings score does not indicate a match, such as the similarity score not meeting a threshold value, then the process 700 does not select a match boost factor (716). Accordingly, the answer score for the candidate answer passage will not be adjusted by a heading boost factor.

Scoring Based on Passage Coverage Ratio

The query question processor 120 limits the candidate answer to a maximum length. The context scoring processor 122 determines a coverage ratio is a measure that is indicative of the coverage of the candidate answer passage from a text block from which it was selected. At text block may be, for example, the text section from which the passage was selected. For example, as shown in FIG. 3, for the text block for candidate answer passage 341 may be only the text from the text section 324, or only the text 340.

Alternatively, the text block may include text sections subordinate to respective headings that include a first heading for which the text section from which the candidate answer passage was selected is subordinate, and sibling headings that have an immediate parent heading in common with the first heading. For example, for the candidate answer passage 341, the text block may include all the text in the portion 380 of the hierarchy; or may include only the text of the sections 322 and 324, of some other portion of text within the portion of the hierarchy. A similar block may be used for the portion 390 of the hierarchy for candidate answer passages selected from that portion 390.

A small coverage ratio may indicate the candidate answer passage is incomplete, while a high coverage ratio may indicate the candidate answer passage captures more of the content of the text passage from which it was selected. A candidate answer passage may receive an adjustment, depending on the coverage ratio.

Figure 8:
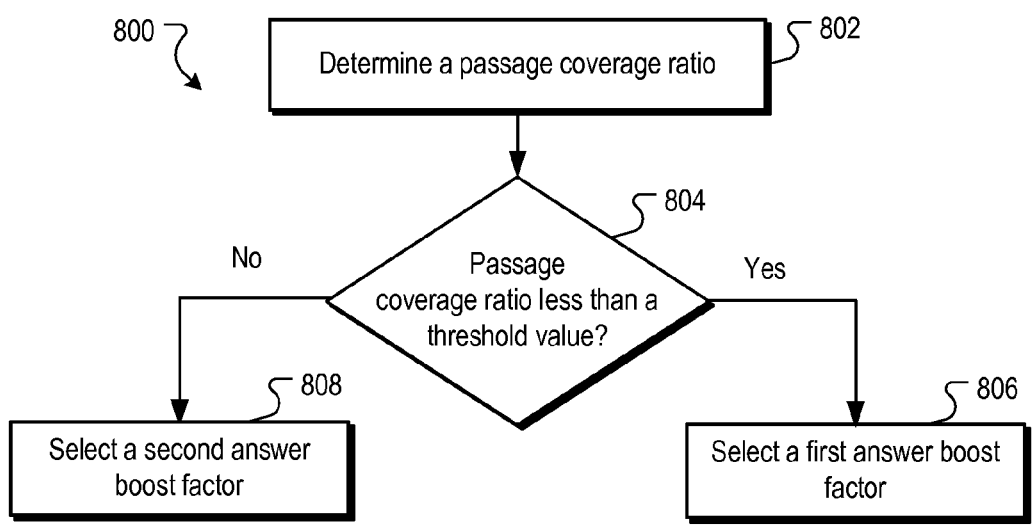
FIG. 8 is a flow diagram of an example process for contextually scoring an answer passage based on a passage coverage ratio.
Figure 9:
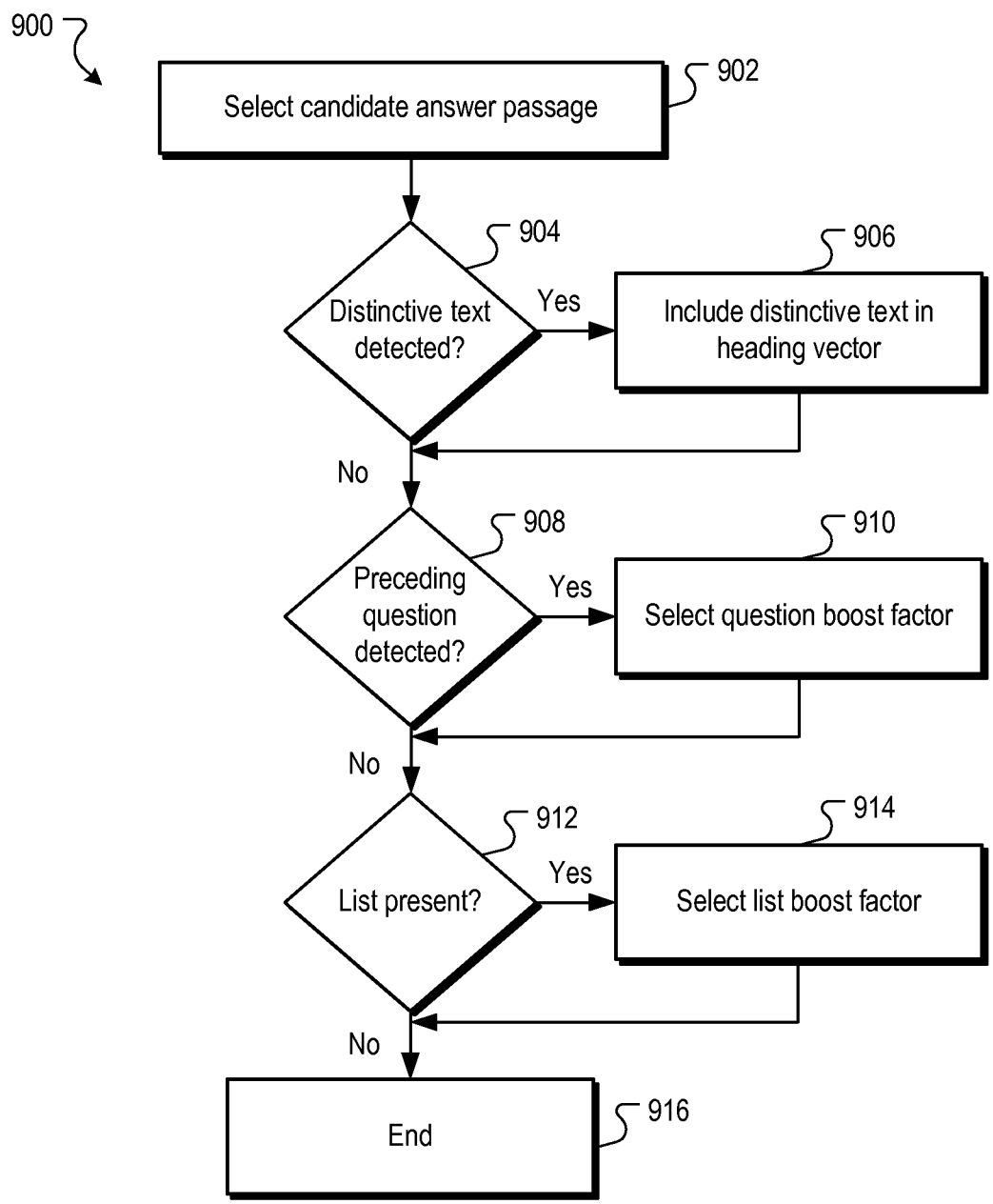
FIG. 9 is a flow diagram of an example process for contextually scoring an answer passage based on additional features, such as distinctive text, a preceding question, and list detection.

FIG. 8 is a flow diagram of an example process 800 for contextually scoring an answer passage based on a passage coverage ratio. The process 800 is implemented in a data processing apparatus, such as one or more computers in a search system 110.

The process 800 determines a passage coverage ratio (802). The passage cover ratio can, for example, be a ratio of the total number of characters in the candidate answer passage to the ratio of the total number of characters in the passage from which the candidate answer passage was selected. Alternatively, the passage cover ratio can be a ratio of the total number of sentences (or words) in the candidate answer passage to the ratio of the total number of sentences (or words) in the passage from which the candidate answer passage was selected. Other ratios can also be used. For the three example candidate answer passages (1)-(3) above, passage (1) has the highest ratio, passage (2) has the second highest, and passage (3) has the lowest.

The process 800 determines whether the coverage ratio is less than a threshold value (804). The threshold value can be, for example, 0.3, 0.35 or 0.4, or some other fraction. In this example, each coverage passage ratio meets or exceeds the threshold value.

If the coverage ratio is less than the threshold value, then the process 800 selects a first answer boost factor (806). The first answer boost factor may be proportional to the coverage ratio according to a first relation, or may be fixed value, or may be a non-boosting value, e.g., 1.0.

Conversely, if the coverage ratio is not less than the threshold value, then the process 800 selects a second answer boost factor (808). The second answer boost factor may be proportional to the coverage ratio according to a second relation, or may be fixed value, or may be a value greater than the non-boosting value, e.g., 1.1.

Scoring Based on Other Features

The context scoring process 122 can also check for the presence of features in addition to those described above. Three example features are described with reference to FIG. 9, which is a flow diagram of an example process 900 for contextually scoring an answer passage based on the additional features of distinctive text, a preceding question, and a list format. The process 900 is implemented in a data processing apparatus, such as one or more computers in a search system 110.

The process 900 selects a candidate answer passage (902). For example, the process 900 can be performed for each of the three candidate answer passages (1)-(3) above.

The process 900 detects for distinctive text (904). Example of distinctive text is text that is formatted to be visually different from other text of a passage from which a candidate answer is selected. One example of distinctive text is bolded text within a passage and that is not a header to the passage and is not text in the candidate answer passage.

If distinctive text is detected, then the process 900 includes the distinctive text in the heading vector (906). This step effectively increases the depth of the heading vector by 1, which, in turn, may result in a slight boost to the candidate answer passage answer score, depending on the scoring adjustment scheme being used.

Conversely, if distinctive text is not detected, or after the process 900 includes the distinctive text in the heading vector, then the process 900 detects for a preceding question (908). A preceding question is a question in text that precedes the candidate answer question. Various amounts of text can be processed to detect for the question. In some implementations, only the passage from which the candidate answer passage is extracted is detected. In other implementations, a text window that can include header text and other text from other sections is checked.

In some implementations, a boost score is inversely proportional to the text distance from a question to the candidate answer passage, and the check is terminated at the occurrence of a first question. The text distance can be measures in characters, words, or sentences, or by some other metric. In some implementations, if the question is anchor text for a section of text and there is intervening text, such as in the case of a navigation list, then the question is determined to only precede the text passage to which it links, and not precede intervening text.

For example, in FIG. 3, there are two questions in the resource: "How long does it take for the Moon to orbit Earth?" and "Why is the distance changing?" The first question—"How long does it take for the Moon to orbit Earth?"—precedes the first candidate answer passage by text distance of zero sentences, and precedes the second candidate answer passage by a text distance of five sentences. The second question—"Why is the distance changing?"—precedes the third candidate answer by zero sentences.

If a preceding question is detected, then the process 900 selects a question boost factor (910). The boost factor may be proportional to the text distance, whether the text is in a text passage subordinate to a header or whether the question is a header, and, if the question is in a header, whether the candidate answer passage is subordinate to the header. Considering these factors, the third candidate answer passage receives the highest boost factor, the first candidate answer receives the second highest boost factor, and the second candidate answer receives the smallest boost factor.

Conversely, if preceding text is not detected, or after the question boost factor is detected, then the process 900 detects for the presence of a list (912). The presence of a list is indicative of a series of steps that are usually instructive or informative in nature. In some implementations, the detection of a list may be subject to the query question being a step modal query. A step modal query is a query of a mode for which a list-based answer is likely to be responsive. Examples of step model queries are [How to . . . ] and [How do I . . . ] queries, e.g., [Hot to install a door knob] or [How do I change a tire].

The context scoring process 122 can detect list by HTML tags, micro formats, semantic meaning, consecutive headings at the same level with the same or similar phrases, e.g., Step 1, Step 2; or First; Second; Third; etc.

The context scoring process 122 can also score a list for quality. For example, a list in the center of a page, which does not include multiple links to other pages (which are indicative of reference lists), and HREF link text that does not occupy a large portion of the text of the list will be of higher quality than a list at the side of a page, and which does include multiple links to other pages (which are indicative of reference lists), and/or has HREF link text that does occupy a large portion of the text of the list.

If a list is detected, then the process 900 selects a list boost factor (914). The list boost factor may be fixed, or may be proportional to the quality score of the list. Conversely, if a list is not detected, or after the list boost factor is selected, the process 900 ends (916).

In some implementations, the list boost factor may also be dependent on other feature scores. Generally, if other features, such as coverage ratio, distinctive text, etc., have relatively high scores, then the list boot factor may be increased. This is because the combination of these scores in the presence of a list is a strong signal of a high quality answer passage.

Adjustment of Answer Scores

The answer scores for candidate answer passages are adjusted by the scoring components based on the heading vectors, passage coverage ratio, and other features described above. A variety of appropriate scoring processes can be used; the scoring process can select a largest boost value from those determined above; or can select a combination of the boost values; etc. After the answer scores are adjusted, the candidate answer passage with the highest adjusted answer score is selected and provided as the answer passage.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a query determined to be a question query that seeks an answer response;
   for each resource of at least one or more resources:
      receive candidate answer passages, each candidate answer passage being text selected from a text section that is subordinate to a respective heading in the resource and, and each answer passage having a corresponding answer score;
      determining a heading hierarchy in the resource, the heading hierarchy having two or more heading levels hierarchically arranged in parent-child relationships, wherein each heading level has one or more headings, a subheading of a respective heading is a child heading in the parent-child relationship and the respective heading is a parent heading in the relationship, and the heading hierarchy includes a root level corresponding to a root heading;
      for each candidate answer passage:
         determining a heading vector that describes a path in the heading hierarchy from the root heading to the respective heading to which the candidate answer passage is subordinate;
         determining a context score based, at least in part, on the heading vector;
         adjusting the answer score of the candidate answer passage based, at least in part, on the context score to form an adjusted answer score; and
      selecting an answer passage from the candidate answer passages based, at least in part, on the adjusted answer scores.

2. The method of claim 1, wherein determining a context score based, at least in part, on the heading vector comprises:
   determining a heading depth of the respective heading, the heading depth being proportional to a number of parent headings from which the respective heading descends from the root node;

determining the context score in proportion to the heading depth.

3. The method of claim 2, wherein determining the context score in proportion to the heading depth comprises:
selecting a first depth boost factor for the context score when the heading depth is less than a threshold depth value; and
selecting a second depth boost factor for the context score when the heading depth is equal to or greater than the threshold depth value, wherein the second boost factor is greater than the first boost factor.

4. The method of claim 1, wherein:
the heading vector includes text of each heading in the path in the heading hierarchy from the root heading to the respective heading; and
determining a context score based, at least in part, on the heading vector comprises determining a similarity score that is a measure of similarity of the question query to the text of the headings in the heading vector; and
adjusting the answer score of the candidate answer passage by the context score to form an adjusted answer score comprises adjusting the answer score by the similarity score.

5. The method of claim 1, further comprising:
for each candidate answer passage, determining a passage coverage ratio that is proportional to the length of the candidate answer passage to the length of a text block from which the candidate answer passage was selected; and
determining the context score further comprises determining the context score in proportion to the passage coverage ratio determined for the candidate answer passage.

6. The method of claim 5, wherein the text block includes only the text section that is subordinate to the respective heading and from which the candidate answer passage was selected.

7. The method of claim 5, wherein the text block comprise text sections subordinate to respective headings, the respective headings including:
a first heading for which the text section from which the candidate answer passage was selected is subordinate; and
sibling headings that have an immediate parent heading in common with the first heading.

8. The method of claim 5, wherein determining a context score in proportion to the passage coverage ratio comprises:
determining a first answer boost factor for the context score when the passage coverage ratio is less than a threshold value; and
determining a second answer boost factor for the context score when the passage coverage ratio is equal to or greater than the threshold value, wherein the second answer boost factor is greater than the first answer boost factor.

9. The method of claim 1, wherein:
the heading vector includes text of each heading in the path in the heading hierarchy from the root heading to the respective heading; and
determining a context score based, at least in part, on the heading vector comprises:
determining a plurality of match scores, the match scores including:
a first score that measures a similarity of the question query to text of the respective heading to which the candidate answer passage is subordinate; and
a second score that measures a similarity of the question query to text of the respective heading to which the candidate answer passage is subordinate and the text of a parent heading of the respective heading;
selecting a first match boost factor for the context score when the first score is greater than the second score; and
selecting a second match boost factor for the context score when the first score is less than the second score, wherein the second match boost factor is less than the first match boost factor.

10. The method of claim 9, further comprising:
determining a third score that measures a similarity of the question query to text of the respective heading to which the candidate answer passage is subordinate, the text of the parent heading of the respective heading, and the text of one or more ancestor headings of the parent heading; and
selecting a third match boost factor for the context score when the second score is less than the third score, wherein the third match boost factor is less than the second match boost factor.

11. The method of claim 1, wherein determining the heading vector that describes a path in the heading hierarchy from the root heading to the respective heading further comprises, for a text section that is subordinate to a respective heading when the text section includes a text formatted according to a predefined formats, including the text formatted according to the predefined format at a child heading of the respective heading in the heading vector.

12. The method of claim 1, further comprising:
for each candidate answer passage, selecting a section of text preceding the candidate answer text from a text block that includes the text section from which the candidate answer passage was selected;
determining that the section of text includes a question sentence that meets a threshold match score for the query question and in response generating a question boost factor for the context score.

13. The method of claim 12, wherein the text block includes only the text section that is subordinate to the respective heading and from which the candidate answer passage was selected.

14. The method of claim 1, further comprising:
determining that the question query is a step modal query, the step modal query being a query of a mode for which a list-based answer is likely to be responsive, and in response:
for each candidate answer passage, determining whether the candidate answer passage is a list-based passage; and
for each candidate answer passage that is determined to be a list based passage, generating a list boost factor for the context score.

15. A system, comprising:
a data processing apparatus; and
a non-transitory computer readable medium in data communication with the data processing apparatus and storing instructions executable by the data processing apparatus that upon such execution cause the data processing apparatus to perform operations comprising:
receiving a query determined to be a question query that seeks an answer response;

for each resource of at least one or more resources:
  receive candidate answer passages, each candidate answer passage being text selected from a text section that is subordinate to a respective heading in the resource and each answer passage having a corresponding answer score;
  determining a heading hierarchy in the resource, the heading hierarchy having two or more heading levels hierarchically arranged in parent-child relationships, wherein each heading level has one or more headings, a subheading of a respective heading is a child heading in the parent-child relationship and the respective heading is a parent heading in the relationship, and the heading hierarchy includes a root level corresponding to a root heading;
  for each candidate answer passage:
    determining a heading vector that describes a path in the heading hierarchy from the root heading to the respective heading to which the candidate answer passage is subordinate;
    determining a context score based, at least in part, on the heading vector;
    adjusting the answer score of the candidate answer passage based, at least in part, on the context score to form an adjusted answer score; and
  selecting an answer passage from the candidate answer passages based, at least in part, on the adjusted answer scores.

16. The system of claim 15, wherein determining a context score based, at least in part, on the heading vector comprises:
  determining a heading depth of the respective heading, the heading depth being proportional to a number of parent headings from which the respective heading descends from the root node;
  determining the context score in proportion to the heading depth.

17. The system of claim 16, wherein determining the context score in proportion to the heading depth comprises:
  selecting a first depth boost factor for the context score when the heading depth is less than a threshold depth value; and
  selecting a second depth boost factor for the context score when the heading depth is equal to or greater than the threshold depth value, wherein the second boost factor is greater than the first boost factor.

18. A non-transitory computer readable medium in data communication with the data processing apparatus and storing instructions executable by the data processing apparatus that upon such execution cause the data processing apparatus to perform operations comprising:
  receiving a query determined to be a question query that seeks an answer response;
  for each resource of at least one or more resources:
    receive candidate answer passages, each candidate answer passage being text selected from a text section that is subordinate to a respective heading in the resource and each answer passage having a corresponding answer score;
    determining a heading hierarchy in the resource, the heading hierarchy having two or more heading levels hierarchically arranged in parent-child relationships, wherein each heading level has one or more headings, a subheading of a respective heading is a child heading in the parent-child relationship and the respective heading is a parent heading in the relationship, and the heading hierarchy includes a root level corresponding to a root heading;
    for each candidate answer passage:
      determining a heading vector that describes a path in the heading hierarchy from the root heading to the respective heading to which the candidate answer passage is subordinate;
      determining a context score based, at least in part, on the heading vector;
      adjusting the answer score of the candidate answer passage based, at least in part, on the context score to form an adjusted answer score; and
    selecting an answer passage from the candidate answer passages based, at least in part, on the adjusted answer scores.

19. The computer readable medium of claim 18, wherein determining a context score based, at least in part, on the heading vector comprises:
  determining a heading depth of the respective heading, the heading depth being proportional to a number of parent headings from which the respective heading descends from the root node;
  determining the context score in proportion to the heading depth.

20. The computer readable medium of claim 19, wherein determining the context score in proportion to the heading depth comprises:
  selecting a first depth boost factor for the context score when the heading depth is less than a threshold depth value; and
  selecting a second depth boost factor for the context score when the heading depth is equal to or greater than the threshold depth value, wherein the second boost factor is greater than the first boost factor.

* * * * *